Dec. 26, 1939.   L. W. THOMPSON   2,184,371
REGULATING SYSTEM
Filed Feb. 16, 1938
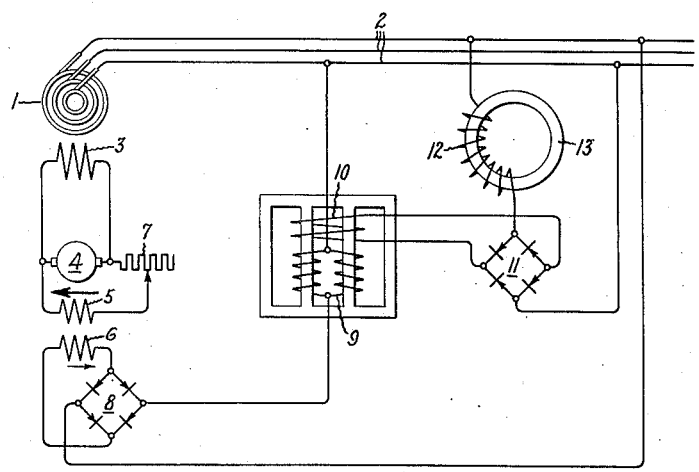
Inventor:
Louis W. Thompson,
by Harry E. Dunham
His Attorney.

Patented Dec. 26, 1939

2,184,371

UNITED STATES PATENT OFFICE 2,184,371

REGULATING SYSTEM

Louis W. Thompson, Schenectady, N. Y., assignor to General Electric Company, a corporation of New York Application February 16, 1938, Serial No. 190,827

3 Claims. (Cl. 171—119)

This invention relates to regulating systems and more particularly to improvements in static electrical regulating means for electrical apparatus.

By "static regulating means" is meant regulating means having no moving parts. Regulating means of this type is often considered desirable as it is characterized by quietness of operation, long life and practically no maintenance expense. Heretofore, the various arrangements of this type have either been relatively expensive and complicated or else they have been relatively insensitive.

In accordance with this invention there is provided a novel and simple static regulator which is characterized by extreme sensitivity and relative simplicity of construction. Briefly, this result is secured by having all of the elements of the system energized in accordance with variations in the regulated quantity and having all of these elements work together, instead of in opposition, to produce the regulating action. In this manner, the elements serve successively to amplify each others effects.

While the invention has been practiced initially for automatically regulating the voltage of an alternating current generator and has used non-linear elements in the form of saturable iron-core reactors, it should be understood that the invention is in no wise so limited and that it may be used to regulate a wide variety of variable quantities of a wide variety of different forms of apparatus and that the non-linear elements employed may be of any of the several types which are well known in the art.

An object of the invention is to provide a new and improved regulating system.

Another object of the invention is to provide a simple and sensitive static electrical regulating system.

The invention will be better understood from the following description taken in connection with the accompanying drawing and its scope will be pointed out in the appended claims.

Refer now to the single figure of the accompanying drawing. This figure illustrates diagrammatically an embodiment of the invention for automatically regulating the voltage of an alternating current generator 1 connected to supply current to a circuit 2. Generator 1 is provided with a field winding 3 energized by a direct current exciter 4 having a main field winding 5 and a bucking field winding 6. The basic excitation provided by the main field winding 5 is controlled by a conventional field rheostat 7.

The bucking field winding 6 is weaker than the main field winding so that increases in current in the bucking field winding serve to decrease the excitation of the exciter, thus, in turn reducing its voltage, reducing the energization of main field winding 3 and, finally, reducing the output voltage of alternator 1. Similarly, a decrease in current in the bucking field winding serves to increase the output voltage of alternator 1.

The bucking field winding 6 is energized directly in accordance with the voltage of circuit 2 through a rectifier 8 having an alternating current input circuit connected across the circuit 2 and having direct current output terminals connected to the bucking winding 6. By "energized directly in accordance with the voltage of circuit 2" is meant that the energization of the bucking field winding 6 increases when the voltage of circuit 2 increases and decreases when the voltage of circuit 2 decreases. Thus, "direct" energization is used in contrast with inverse energization in which an increase in the voltage of circuit 2 would cause a decrease in the current in the field winding 6 and vice versa.

Connected serially in the input side of the rectifier 8 are the alternating current windings 9 of an iron-core saturable reactor. This reactor carries a direct current saturating winding 10 which is also energized directly in accordance with the voltage of circuit 2 by means of a rectifier 11 whose input circuit is connected across the main circuit 2 and whose direct current output terminals are connected to energize winding 10. Serially connected in the input of the rectifier 11 is a self-saturating iron-core reactor 12 provided with an iron-core 13 which is of toroidal form so as to reduce to a minimum the leakage flux.

The operation of the illustrated embodiment of the invention is as follows. Considering first, elements 1 to 8, inclusive, it will be seen that whenever the voltage of the circuit 2 changes, the current in winding 6 will change in the same direction and, as has been explained this will cause an opposite change in the excitation and voltage of the main generator 1. Thus, a certain amount of static automatic regulation is secured with the first eight elements alone. However, changes in current in the windings 9 caused by changes in voltage of the circuit 2 will change the effective permeability of the four-legged core in such a manner that increases in current decrease the reactance of these windings and decreases in current increase the reactance of these windings. Thus, the non-linear characteristic of the alternating current windings 9 serves to amplify the already present regulating effect and, thus, renders the circuit more sensitive to changes in voltage. This amplified regulating effect is still further amplified by the direct current saturating winding 10 which is energized through the rectifier 11. Thus, disregarding for the time being the reactor 13, it is clear that an increase in voltage of the circuit 2 increases the direct current in the saturating winding 10 and a decrease in voltage of the circuit 2 decreases the saturating current of the winding 10. These changes in saturating current in the direct current winding 10 further change the effective permeability of the four-legged core and, thus, amplify the change in reactance of the windings 9 with changes in voltage of the circuit 2. Finally, the already doubly amplified regulating circuit is further amplified by the non-linear action of the self-saturating reactor 12 which is so arranged that at normal voltage the core 13 is worked at a flux density which is near the knee of the magnetization current. Thus, a slight increase in voltage of circuit 2 will cause a relatively large decrease in reactance of reactor 12 due to magnetic saturation of the core and this decrease in reactance will combine with the increased voltage to produce an amplified increase in current in the winding 10 in response to an increase in voltage. Similarly, a decrease in voltage will result in marked de-saturation of the core 13 and, thus, in an amplified decrease of saturating current in the winding 10.

The result of these three successive amplifications of the basic regulating circuit consisting of the first eight elements of the drawing, which amplifications are caused, first, by the self-saturation effect caused by the windings 9 alone, secondly, by the direct current winding 10 and, thirdly, by the self-saturating reactor 12, results in a very sensitive and quick-acting voltage regulator.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternator for supplying current to an electric circuit, a field winding on said alternator, an exciter for energizing said field winding, a main field winding on said exciter, a bucking field winding on said exciter, a rectifier having alternating current input terminals connected to be responsive to the voltage of said circuit and having direct current output terminals connected to energize said bucking winding, an iron-core reactor connected in circuit with said input terminals, a direct current winding on said reactor for controlling the saturation of its core, a second rectifier having alternating current input terminals connected to be responsive to the voltage of said circuit and having direct current output terminals connected to energize said direct current winding, and a self-saturating iron-core reactor connected in circuit with the alternating current input terminals of said second rectifier.

2. In combination, an alternator for supplying current to an electric circuit, means for controlling the excitation of said alternator comprising a main field winding and a weaker bucking field winding, a rectifier having alternating current input terminals connected to be responsive to the voltage of said circuit and having direct current output terminals connected to energize said bucking winding, an iron-core reactor connected in circuit with said input terminals, a direct current winding on said reactor for controlling the saturation of its core, a second rectifier having alternating current input terminals connected to be responsive to the voltage of said circuit and having direct current output terminals connected to energize said direct current winding, and a self-saturating iron-core reactor connected in circuit with the alternating current input terminals of said second rectifier.

3. In combination, a dynamo-electric machine connected to an electric circuit, excitation means for said machine comprising a main field winding and a weaker bucking field winding, a rectifier having alternating current input terminals connected to be responsive to the voltage of said circuit and direct current output terminals connected to energize said bucking winding, a negative impedance-current characteristic device connected in circuit with said input terminals, separate means for controlling the impedance of said device, a second rectifier having alternating current input terminals connected to be responsive to the voltage of said circuit and having direct current output terminals connected to energize said impedance controlling means, and a second negative impedance-current characteristic device connected in circuit with the alternating current input terminals of said second rectifier.

LOUIS W. THOMPSON.